US007888897B2

(12) United States Patent
Murai

(10) Patent No.: US 7,888,897 B2
(45) Date of Patent: Feb. 15, 2011

(54) SEMICONDUCTOR INTEGRATED CIRCUIT FOR SENSORLESS DRIVING AND SENSORLESS DRIVING SYSTEM

(75) Inventor: Shigeki Murai, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 428 days.

(21) Appl. No.: 12/034,813

(22) Filed: Feb. 21, 2008

(65) Prior Publication Data

US 2008/0203951 A1 Aug. 28, 2008

(30) Foreign Application Priority Data

Feb. 23, 2007 (JP) ............................. 2007-043925

(51) Int. Cl.
*H02P 6/06* (2006.01)
(52) U.S. Cl. .................. 318/400.06; 318/368; 318/375; 318/400.34; 318/400.35
(58) Field of Classification Search ................. 318/368, 318/374, 375, 377, 700, 400.01, 400.26, 318/400.27, 400.34, 400.35, 400.06
See application file for complete search history.

(56) References Cited

U.S. PATENT DOCUMENTS 5,481,166 A * 1/1996 Moreira ................. 318/400.04
6,215,261 B1 * 4/2001 Becerra .................. 318/400.26
6,580,236 B2 * 6/2003 Mitsuda .................. 318/400.17
6,922,032 B2 7/2005 Maeda
6,979,970 B2 * 12/2005 Iwanaga et al. ........ 318/400.35
7,274,161 B2 * 9/2007 Mori et al. ............. 318/400.36
2007/0205731 A1 * 9/2007 Beifus ......................... 318/362

FOREIGN PATENT DOCUMENTS

JP 2000-050679 2/2000

* cited by examiner

*Primary Examiner*—Walter Benson
*Assistant Examiner*—Thai Dinh
(74) *Attorney, Agent, or Firm*—Turocy & Watson, LLP

(57) ABSTRACT

A semiconductor integrated circuit for sensorless driving of a brushless motor, has: an induced voltage detecting circuit which includes a comparator for comparing a voltage induced in an exciting coil by a rotation of a rotor of the brushless motor with a midpoint voltage of the rotor of the brushless motor and outputting a detection signal corresponding to a comparison result, and detects a zero cross point where the induced voltage crosses the midpoint voltage; a logic circuit that outputs a control signal for controlling the brushless motor, in response to a command signal for regulating an operation of the brushless motor and an output signal of the comparator; and a power transistor circuit that supplies a driving current to the exciting coil.

11 Claims, 3 Drawing Sheets

SEMICONDUCTOR INTEGRATED CIRCUIT FOR SENSORLESS DRIVING AND SENSORLESS DRIVING SYSTEM

CROSS-REFERENCE TO RELATED APPLICATION

This application is based upon and claims the benefit of priority from the prior Japanese Patent Application No. 2007-43925, filed on Feb. 23, 2007, the entire contents of which are incorporated herein by reference.

BACKGROUND OF THE INVENTION

1. Field of the Invention

The present invention relates to a semiconductor integrated circuit for the sensorless driving of a brushless motor, and a sensorless driving system.

2. Background Art

Conventionally, in the sensorless driving of brushless motors, induced voltages are detected which are obtained from exciting coils by the rotations of rotors. When the detected induced voltage is shifted in phase by, e.g., 30 degrees from a zero cross point crossing the midpoint voltage of the rotor, a commutating operation is performed.

Regarding this sensorless driving method, a method of detecting the rotational position of a rotor is available. The rotational position is detected by outputting, e.g., a sensing pulse when the position of the rotor is detected during a short brake in which exciting coils are connected to the ground.

Because of this sensing pulse, a complicated circuit is necessary for detecting the position of the rotor and it is further necessary to consider a resistance between the terminals of a brushless motor and an inductance between the terminals of the brushless motor.

As prior art, a commutation abnormality detecting apparatus is available which includes: polarity identifying means fed with a three-phase induced voltage outputted from a three-phase brushless motor to identify the polarity of the voltage, actual commutation mode generating means for estimating a commutation mode based on the identification result, actual commutation mode generating means for generating a commutation mode determined in a predetermined order with reference to the reference voltage of the induced voltage, and commutation mode comparing means for deciding whether the commutation mode estimated by the commutation mode estimating means and the commutation mode generated by the actual commutation mode generating means match with each other (e.g., see Japanese Patent Laid-Open Publication No. 2000-50679).

In the prior art, it is detected whether the commutation is normal or not during the commutating operation but the rotational position of a rotor is not detected during a short brake.

SUMMARY OF THE INVENTION

According to one aspect of the present invention, there is provided: a semiconductor integrated circuit for sensorless driving of a brushless motor, comprising:

an induced voltage detecting circuit which includes a comparator for comparing a voltage induced in an exciting coil by a rotation of a rotor of the brushless motor with a midpoint voltage of the rotor of the brushless motor and outputting a detection signal corresponding to a comparison result, and detects a zero cross point where the induced voltage crosses the midpoint voltage;

a logic circuit that outputs a control signal for controlling the brushless motor, in response to a command signal for regulating an operation of the brushless motor and an output signal of the comparator; and a power transistor circuit that supplies a driving current to the exciting coil, the power transistor including a first transistor having one end connected to a power supply and the other end connected to the exciting coil and being controlled in response to the control signal, and a second transistor connected between the other end of the first transistor and a ground and being controlled in response to the control signal, wherein the comparator has an in-phase input voltage range in which a voltage not larger than a ground voltage can be detected, and during a short brake in which the brushless motor is braked by turning off the first transistor and turning on the second transistor to short-circuit the exciting coil of the brushless motor with the ground, the comparator compares a voltage generated according to the induced voltage and the midpoint voltage of the rotor of the brushless motor and outputs the detection signal according to a comparison result, and the logic circuit decides a rotational position of the rotor based on the detection signal.

According to the other aspect of the present invention, there is provided: a sensorless driving system for sensorless driving of a brushless motor, comprising:

an induced voltage detecting circuit which includes a comparator for comparing a voltage induced in an exciting coil by a rotation of a rotor of the brushless motor with a midpoint voltage of the rotor of the brushless motor and outputting a detection signal corresponding to a comparison result, and detects a zero cross point where the induced voltage crosses the midpoint voltage;

a command circuit that outputs a command signal for regulating an operation of the brushless motor, a logic circuit that outputs a control signal for controlling the brushless motor, in response to the command signal and an output signal of the comparator; and a power transistor circuit that supplies a driving current to the exciting coil, the power transistor including a first transistor having one end connected to a power supply and the other end connected to the exciting coil and being controlled in response to the control signal, and a second transistor connected between the other end of the first transistor and a ground and being controlled in response to the control signal, wherein the comparator has an in-phase input voltage range in which a voltage not larger than a ground voltage can be detected, and during a short brake in which the brushless motor is braked by turning off the first transistor and turning on the second transistor to short-circuit the exciting coil of the brushless motor with the ground, the comparator compares a voltage generated according to the induced voltage and the midpoint voltage of the rotor of the brushless motor and outputs the detection signal according to a comparison result, and the logic circuit decides a rotational position of the rotor based on the detection signal.

According to further aspect of the present invention, there is provided: a semiconductor integrated circuit for sensorless driving of a three-phase brushless motor, comprising:

an induced voltage detecting circuit which includes three comparators for comparing voltages induced in three exciting coils by a rotation of a rotor of the three-phase brushless motor with a midpoint voltage of the rotor of the brushless motor and outputting detection signals corresponding to comparison results, and detects zero cross points where the induced voltages cross the midpoint voltage;

a logic circuit that outputs a control signal for controlling the three-phase brushless motor, in response to a command signal for regulating an operation of the three-phase brushless motor and output signals of the comparators; and a power transistor circuit that supplies a driving current to the exciting coil, the power transistor including a first transistor having one end connected to a power supply and the other end connected to the exciting coil and being controlled in response to the control signal, and a second transistor connected between the other end of the first transistor and a ground and being controlled in response to the control signal, wherein the comparator has an in-phase input voltage range in which a voltage not larger than a ground voltage can be detected, and during a short brake in which the brushless motor is braked by turning off the first transistor and turning on the second transistor to short-circuit the exciting coil of the brushless motor with the ground, the comparator compares a voltage generated according to the induced voltage and the midpoint voltage of the rotor of the brushless motor and outputs the detection signal according to a comparison result, and the logic circuit decides a rotational position of the rotor based on the detection signal.

DETAILED DESCRIPTION

An embodiment of the present invention will now be described in accordance with the accompanying drawings.

Embodiment

Figure 1:
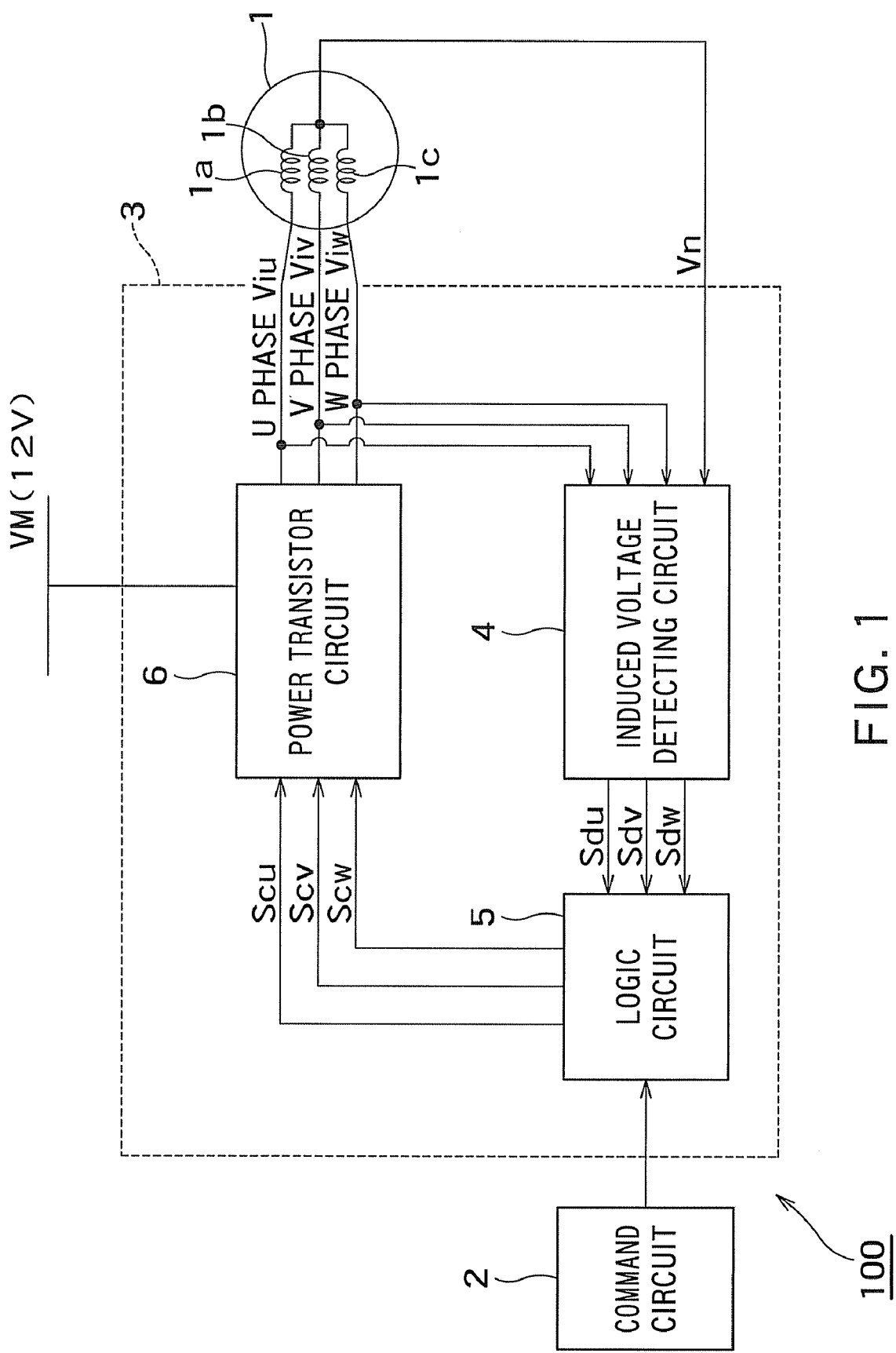
FIG. 1 illustrates a configuration of a part of a sensorless driving system 100 according to an embodiment which is an aspect of the present invention.

FIG. 1 illustrates the configuration of the part of a sensorless driving system 100 according to an embodiment which is an aspect of the present invention.

As shown in FIG. 1, the sensorless driving system 100 includes a command circuit 2 for outputting a command signal for regulating the operations of a brushless motor 1, and a semiconductor integrated circuit 3 for controlling the brushless motor 1 in response to the command signal outputted from the command circuit 2.

The brushless motor 1 of the present embodiment is, for example, a three-phase brushless motor including first to third exciting coils 1a to 1c each having one end connected to the shared midpoint of the brushless motor 1. The brushless motor 1 may be a brushless motor other than a three-phase brushless motor.

The command circuit 2 outputs the command signal to the semiconductor integrated circuit 3 for sensorless driving to supply power to the brushless motor 1 and rotate the brushless motor 1. Furthermore, the command circuit 2 outputs the command signal to the semiconductor integrated circuit 3 for sensorless driving to cancel the power supply to the brushless motor 1. Moreover, the command circuit 2 outputs the command signal to the semiconductor integrated circuit 3 for sensorless driving to apply a counter torque to the brushless motor 1 and brake the brushless motor 1. Furthermore, the command circuit 2 outputs the command signal to the semiconductor integrated circuit 3 for sensorless driving to brake the brushless motor 1 by a short brake.

The semiconductor integrated circuit 3 for sensorless driving includes an induced voltage detecting circuit 4 for detecting a zero cross point where an induced voltage crosses the midpoint voltage, a logic circuit 5 for controlling the brushless motor 1, and a power transistor circuit 6 for supplying driving current to the exciting coils.

Figure 2:
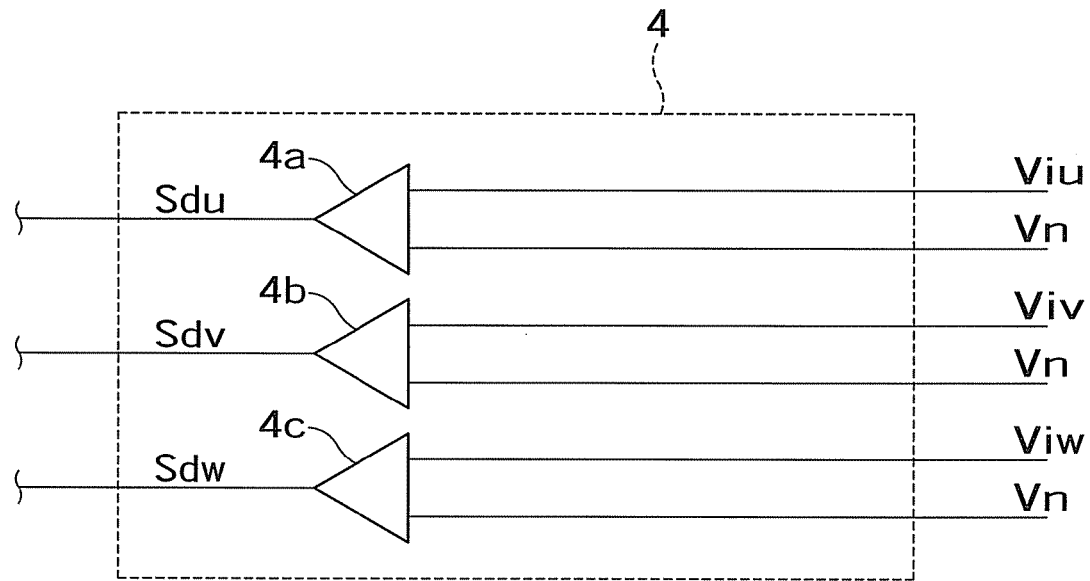
FIG. 2 illustrates an arrangement of a part of the induced voltage detecting circuit 4 in the sensorless driving system 100 of FIG. 1.

FIG. 2 illustrates the arrangement of the part of the induced voltage detecting circuit 4 in the sensorless driving system 100 of FIG. 1.

As shown in FIG. 2, the induced voltage detecting circuit 4 includes a first comparator 4a, a second comparator 4b, and a third comparator 4c.

The first comparator 4a compares a voltage Viu induced in the U-phase first exciting coil 1a by the rotation of the rotor of the brushless motor 1 and a midpoint voltage Vn of the rotor of the brushless motor 1, and outputs a detection signal Sdu corresponding to the comparison result.

The second comparator 4b compares a voltage Viv induced in the V-phase second exciting coil 1b and the midpoint voltage Vn of the rotor of the brushless motor 1, and outputs a detection signal Sdv corresponding to the comparison result.

The third comparator 4c compares a voltage Viw induced in the W-phase third exciting coil 1c and the midpoint voltage Vn of the rotor of the brushless motor 1, and outputs a detection signal Sdw corresponding to the comparison result.

The first to third comparators 4a to 4c each have an in-phase input voltage range in which a voltage not larger than a ground voltage GND can be detected.

The induced voltage detecting circuit 4 detects zero cross points where the induced voltages Viu, Viv, and Viw cross the midpoint voltage Vn, by the comparing operations of the first to third comparators 4a to 4c.

As shown in FIG. 1, the logic circuit 5 outputs control signals Scu, Scv, and Scw for controlling the brushless motor 1 in response to the command signal outputted from the command circuit 2 and the detection signals Sdu, Sdv, and Sdw of the first to third comparators 4a to 4c.

Figure 3:
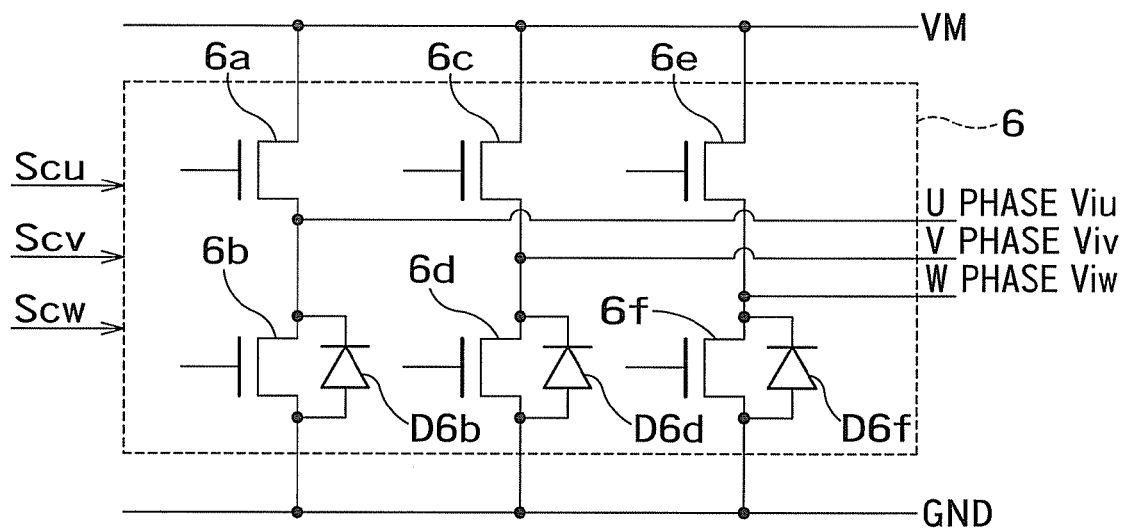
FIG. 3 illustrates an arrangement of a part of the power transistor circuit 6 in the sensorless driving system 100 of FIG. 1.

FIG. 3 illustrates the arrangement of the part of the power transistor circuit 6 in the sensorless driving system 100 of FIG. 1.

As shown in FIG. 3, the power transistor circuit 6 includes a first MOS transistor 6a which has one end connected to a power supply VM and the other end connected to the other end of the first exciting coil 1a and is controlled in response to the control signal Scu, and a second MOS transistor 6b which is connected between the other end of the first MOS transistor 6a and a ground GND and is controlled in response to the control signal Scu.

Similarly, the power transistor circuit 6 includes a third MOS transistor 6c which has one end connected to the power supply VM and the other end connected to the other end of the second exciting coil 1b and is controlled in response to the control signal Scv, and a fourth MOS transistor 6d which is connected between the other end of the third MOS transistor 6c and the ground GND and is controlled in response to the control signal Scu.

Similarly, the power transistor circuit 6 includes a fifth MOS transistor 6e which has one end connected to the power supply VM and the other end connected to the other end of the third exciting coil 1c and is controlled in response to the control signal Scw, and a sixth MOS transistor 6f which is connected between the other end of the fifth MOS transistor 6e and the ground GND and is controlled in response to the control signal Scw.

The following will discuss the operations of the semiconductor integrated circuit 3 for sensorless driving configured thus.

When a torque is applied to the brushless motor 1, the first MOS transistor 6a and the second MOS transistor 6b are controlled based on the control signal Scu so as to be turned on/off in a complementary manner.

For example, when the first MOS transistor 6a and the second MOS transistor 6b have different conductivity types, signals having the same logic are inputted to the transistors. When the first MOS transistor 6a and the second MOS transistor 6b have the same conductivity type, signals having different logics are inputted to the transistors. In response to the signals, a driving current is applied to the first exciting coil 1a.

Similarly, at positions displaced 120 electrical degrees from each other, the third MOS transistor 6c and the fourth MOS transistor 6d are controlled based on the control signal Scv so as to be turned on/off in a complementary manner. Thus a driving current is applied to the second exciting coil 1b.

Similarly, at positions further displaced 120 electrical degrees from each other, the fifth MOS transistor 6e and the sixth MOS transistor 6f are controlled based on the control signal Scw so as to be turned on/off in a complementary manner. Thus a driving current is applied to the third exciting coil 1c. With these operations, current passes through the exciting coil 1a, the exciting coil 1b, and the exciting coil 1c of the brushless motor 1, a commutating operation is performed, and a driving torque is produced in the brushless motor 1.

The commutating operation rotates the rotor of the brushless motor 1.

The following will particularly discuss the braking operation of a short brake.

During a short brake, the first, third, and fifth MOS transistors 6a, 6c and 6e are turned off and the second, fourth, and sixth MOS transistors 6b, 6d and 6f are turned on to short-circuit the first to third exciting coils 1a to 1c of the brushless motor 1 with the ground. Thus the brushless motor 1 is braked.

During the short brake, the first to third exciting coils 1a to 1c are grounded as described above and thus the midpoint voltage Vn of the brushless motor 1 is brought close to the ground voltage GND. Furthermore, an induced voltage is generated while the rotor is rotated. The induced voltage allows current to pass through the second, fourth, and sixth MOS transistors 6b, 6d and 6f and diodes D6b, D6d and D6f corresponding to these transistors, and generates a voltage waveform. The voltage waveform fluctuates around the midpoint voltage Vn having been brought close to the ground voltage GND.

Therefore, the voltage waveform generated according to the induced voltage during the short brake fluctuates to a value not larger than the ground voltage GND.

Figure 4:
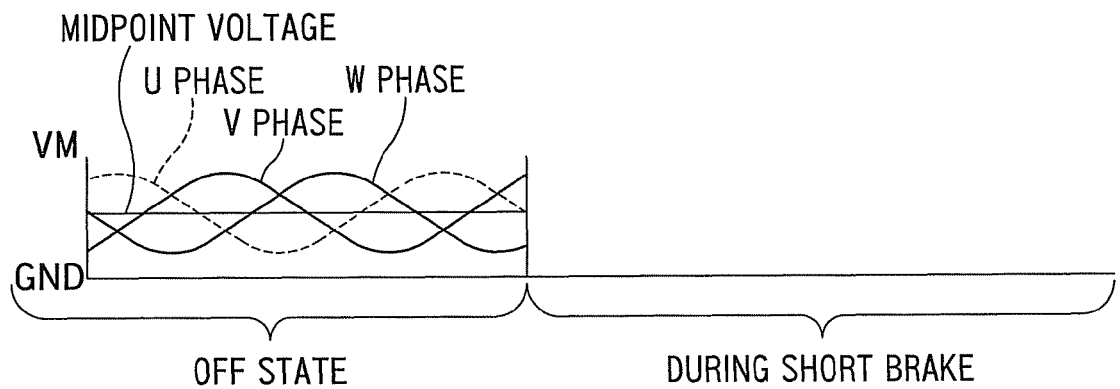
FIG. 4 illustrates the waveforms of induced voltages when the power is turned off and the rotor of the brushless motor 1 is rotated by inertia, and voltage waveforms generated according to the induced voltages during a short brake.
Figure 5:
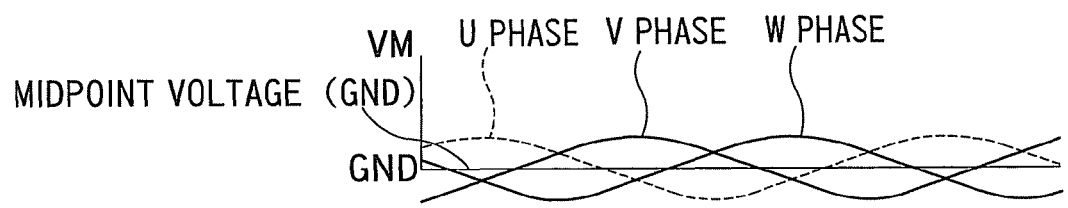
FIG. 5 is an enlarged view of the voltage waveforms generated according to the induced voltages during the short brake in FIG. 4.

FIG. 4 illustrates the waveforms of induced voltages when the power is turned off and the rotor of the brushless motor 1 is rotated by inertia, and voltage waveforms generated according to the induced voltages during a short brake. FIG. 5 is an enlarged view of the voltage waveforms generated according to the induced voltages during the short brake in FIG. 4. In the off state of FIG. 4, the first to sixth MOS transistors 6a to 6e are turned off.

As shown in FIG. 4, the midpoint voltage Vn of the brushless motor 1 in the off state is, for example, an intermediate voltage (6 V) between the power supply voltage VM (12 V) and the ground voltage GND (0 V). Therefore, the induced voltage fluctuates between 0 V and 12 V. Furthermore, during the short brake, the midpoint voltage Vn is brought close to the ground voltage GND as described above.

However, as shown in FIG. 5, the voltage waveform (e.g., about ±0.01 V) is generated according to the induced voltage while the rotor is rotated during the short brake. Thus the first to third comparators 4a to 4c have to be at least so sensitive as to detect changes of the voltage waveforms generated according to the induced voltages during the short brake.

When deciding the rotational position of the rotor during the short brake, the first to third comparators 4a to 4c first compare voltages generated according to the induced voltages Viu, Viv and Viw with the midpoint voltage Vn of the brushless motor 1, and output the detection signals Sdu, Sdv and Sdw according to the comparison results.

Then, the logic circuit 5 decides the rotational position of the rotor of the brushless motor 1 based on the detection signals Sdu, Sdv and Sdw.

As described above, the first to third comparators 4a to 4c each have an in-phase input voltage range in which a voltage not larger than the ground voltage can be detected. Therefore, even when the midpoint voltage Vn decreases close to the ground voltage GND and the voltage waveforms generated according to the induced voltages decrease to the ground voltage GND or lower during the short brake, the first to third comparators 4a to 4c can compare the voltage waveforms generated according to the induced voltages Viu, Viv and Viw with the midpoint voltage Vn without malfunctions.

In other words, the induced voltage detecting circuit 4 can accurately detect the zero cross points where the voltage waveforms generated according to the induced voltages cross the midpoint voltage during the short brake.

Furthermore, the rotational position of the rotor can be accurately detected during the short brake. Thus it is possible to smoothly make a transition to sensorless driving even from the short brake.

As described above, according to the semiconductor integrated circuit for sensorless driving and the sensorless driving system of the present embodiment, it is possible to more accurately detect the rotational position of the rotor of the brushless motor during a short brake.

In the above embodiment, the power transistor circuit 6 is configured by the MOS transistors. The same effect as the above embodiment can be obtained also when the MOS transistors are replaced with a configuration including diodes connected to bipolar transistors.

What is claimed is:

1. A semiconductor integrated circuit for sensorless driving of a brushless motor, comprising:
    an induced voltage detecting circuit which includes a comparator for comparing a voltage induced in an exciting coil by a rotation of a rotor of the brushless motor with a midpoint voltage of the rotor of the brushless motor and outputting a detection signal corresponding to a comparison result, and detects a zero cross point where the induced voltage crosses the midpoint voltage;
    a logic circuit that outputs a control signal for controlling the brushless motor, in response to a command signal for regulating an operation of the brushless motor and an output signal of the comparator; and a power transistor circuit that supplies a driving current to the exciting coil, the power transistor including a first transistor having one end connected to a power supply and the other end connected to the exciting coil and being controlled in response to the control signal, and a second transistor connected between the other end of the first transistor and a ground and being controlled in response to the control signal, wherein the comparator has an in-phase input voltage range in which a voltage not larger than a ground voltage can be detected, the comparator being at least so sensitive as to detect a change of a voltage waveform generated according to the induced voltage during the short brake, and during a short brake in which the brushless motor is braked by turning off the first transistor and turning on the second transistor to short-circuit the exciting coil of the brushless motor with the ground, the comparator compares a voltage generated according to the induced voltage and the midpoint voltage of the rotor of the brushless motor and outputs the detection signal according to a comparison result, and the logic circuit decides a rotational position of the rotor based on the detection signal.

2. The semiconductor integrated circuit for sensorless driving according to claim 1, wherein the brushless motor is a three-phase brushless motor.

3. The semiconductor integrated circuit for sensorless driving according to claim 2, wherein the first and second transistors are MOS transistors.

4. The semiconductor integrated circuit for sensorless driving according to claim 1, wherein the first and second transistors are MOS transistors.

5. The semiconductor integrated circuit for sensorless driving according to claim 1, wherein the midpoint voltage decreases close to the ground voltage and the voltage waveform generated according to the induced voltage decreases to the ground voltage or lower during the short brake.

6. A sensorless driving system for sensorless driving of a brushless motor, comprising:

an induced voltage detecting circuit which includes a comparator for comparing a voltage induced in an exciting coil by a rotation of a rotor of the brushless motor with a midpoint voltage of the rotor of the brushless motor and outputting a detection signal corresponding to a comparison result, and detects a zero cross point where the induced voltage crosses the midpoint voltage;

a command circuit that outputs a command signal for regulating an operation of the brushless motor, a logic circuit that outputs a control signal for controlling the brushless motor, in response to the command signal and an output signal of the comparator; and a power transistor circuit that supplies a driving current to the exciting coil, the power transistor including a first transistor having one end connected to a power supply and the other end connected to the exciting coil and being controlled in response to the control signal, and a second transistor connected between the other end of the first transistor and a ground and being controlled in response to the control signal, wherein the comparator has an in-phase input voltage range in which a voltage not larger than a ground voltage can be detected, the comparator being at least so sensitive as to detect a change of a voltage waveform generated according to the induced voltage during the short brake, and during a short brake in which the brushless motor is braked by turning off the first transistor and turning on the second transistor to short-circuit the exciting coil of the brushless motor with the ground, the comparator compares a voltage generated according to the induced voltage and the midpoint voltage of the rotor of the brushless motor and outputs the detection signal according to a comparison result, and the logic circuit decides a rotational position of the rotor based on the detection signal.

7. The sensorless driving system according to claim 6, wherein the brushless motor is a three-phase brushless motor.

8. The sensorless driving system according to claim 7, wherein the first and second transistors are MOS transistors.

9. The sensorless driving system according to claim 6, wherein the first and second transistors are MOS transistors.

10. A semiconductor integrated circuit for sensorless driving of a three-phase brushless motor, comprising:

an induced voltage detecting circuit which includes three comparators for comparing voltages induced in three exciting coils by a rotation of a rotor of the three-phase brushless motor with a midpoint voltage of the rotor of the brushless motor and outputting detection signals corresponding to comparison results, and detects zero cross points where the induced voltages cross the midpoint voltage;

a logic circuit that outputs a control signal for controlling the three-phase brushless motor, in response to a command signal for regulating an operation of the three-phase brushless motor and output signals of the comparators; and a power transistor circuit that supplies a driving current to the exciting coil, the power transistor including a first transistor having one end connected to a power supply and the other end connected to the exciting coil and being controlled in response to the control signal, and a second transistor connected between the other end of the first transistor and a ground and being controlled in response to the control signal, wherein the comparator has an in-phase input voltage range in which a voltage not larger than a ground voltage can be detected, the comparator being at least so sensitive as to detect a change of a voltage waveform generated according to the induced voltage during the short brake, and during a short brake in which the brushless motor is braked by turning off the first transistor and turning on the second transistor to short-circuit the exciting coil of the brushless motor with the ground, the comparator compares a voltage generated according to the induced voltage and the midpoint voltage of the rotor of the brushless motor and outputs the detection signal according to a comparison result, and the logic circuit decides a rotational position of the rotor based on the detection signal.

11. The semiconductor integrated circuit for sensorless driving according to claim 10, wherein the first and second transistors are MOS transistors.

* * * * *